United States Patent Office 3,543,024
Patented Nov. 24, 1970

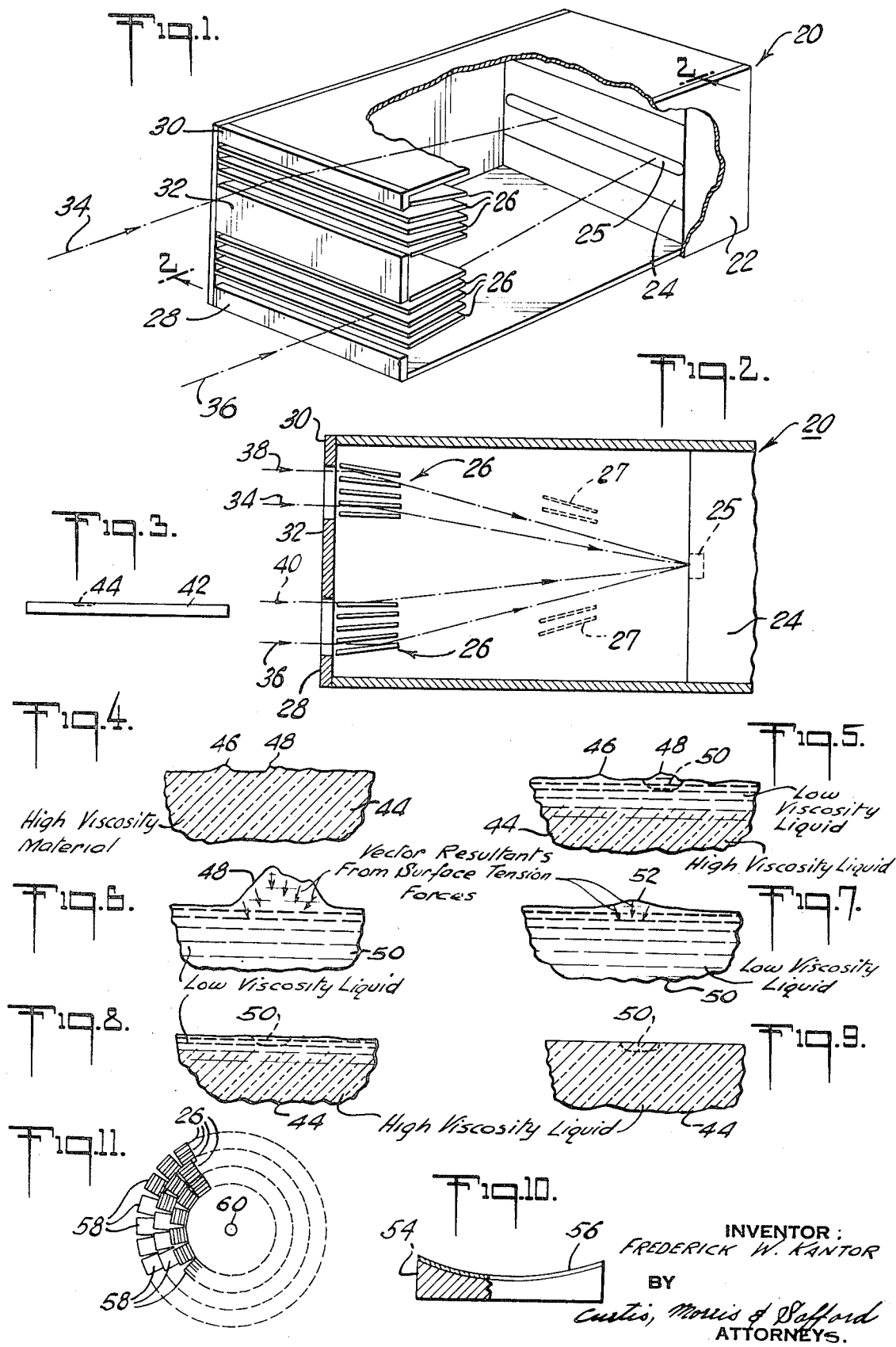

3,543,024
GLANCING-INCIDENCE RADIATION FOCUSING DEVICE HAVING A PLURALITY OF MEMBERS WITH TENSION-POLISHED REFLECTING SURFACES
Frederick W. Kantor, 610 W. 114th St.,
New York, N.Y. 10025
Filed Feb. 3, 1967, Ser. No. 613,858
Int. Cl. G01t 1/00
U.S. Cl. 250—53
9 Claims

ABSTRACT OF THE DISCLOSURE

Glacing-incidence short wave-length radiation focusing system utilizing extremely smooth "tension-polished" reflecting surfaces. The surfaces are formed quite inexpensively by slowly thickening a liquid of low viscosity, such as molten glass, to an extremely high viscosity, thus allowing liquid surface tension to smooth or "polish" the surface before it hardens.

This invention relates to "glancing-incidence" focusing of short wave-length radiation; that is, to the focusing of radiation such as X-rays and neutrons by deflecting the moving particles off reflecting surfaces at an angle of incidence so small that the particle is said to be "glancing" off the surface. More particularly, this invention relates to reflecting members having extremely smooth surfaces for deflecting and focusing such particles, and to methods of manufacturing such members.

There are a number of instances in which it is desirable to focus radiation such as X-rays and low-energy neutrons. For example, in the investigation of X-rays which emanate from the sun or other astronomical bodies, the source of X-rays is located at a great distance from the investigating equipment. Thus, the X-ray flux density tends to be relatively small and often is overcome or badly distorted by random radiation "noise" signals received by the investigating equipment. Focusing the X-rays on a relatively small area vastly increases the signal-to-noise ratio of the instrument and correspondingly improves the quality of the information obtained.

It is difficult to focus high-energy radiation such as X-rays and neutrons, and often it has been found necessary to use the "glancing-incidence" focusing method briefly described above, in which the particles are made to impinge upon a smooth reflecting surface at a very small angle of incidence. For example, the usual angle of incidence is between zero and eight degrees, and preferably is less than one degree. A serious practical problem is that the reflecting surfaces must be extremely smooth in order for the instrument to operate.

Many glancing-incidence focusing devices have been proposed in the past. Examples of such devices are seen in U.S. Pat. 3,142,651 to Giacconi et al.; U.S. Pat. 2,819,-404 to Herrnring et al.; and U.S. Pat. 2,759,106 to Wolter, and in numerous other prior patents. Typical reflecting members used in such prior devices include mechanically-polished glass surfaces, both with and without evaporated metal coatings on the surfaces. However, the smoothness requirements are such that the mechanical polishing operation is extremely time-consuming and costly. Modern large-aperture X-ray focusing instruments require such large reflecting internal surface areas that the cost of the reflecting surfaces to date has made the manufacture of such instruments prohibitive.

In accordance with the foregoing, it is the principal object of this invention to provide a glancing-incidence focusing device with reflecting surfaces which are relatively inexpensive and simple to produce, and yet are extremely smooth. Furthermore, it is another object of the present invention to provide a method for manufacturing such a device which is simple, quick, and relatively error-free.

Briefly, the present invention comprises a glancing-incidence focusing device with "tension-polished" reflecting surfaces, and methods for forming such surfaces. A "tension-polished" surface, as the term is used in this description, is a surface formed from a liquid of relatively low viscosity whose viscosity has been increased relatively slowly to a relatively high level in order to allow surface tension forces to smooth out irregularities in the surface before the viscosity becomes extremely high.

The drawings and description that follow describe the invention and indicate some of the ways in which it can be used. In addition, some of the advantages provided by the invention will be pointed out.

In the drawings:

FIG. 1 is a perspective, partially broken-away view of an X-ray focusing and measurement device constructed in accordance with the present invention;

FIG. 2 is a cross-sectional view taken along line 2—2 of FIG. 1;

FIG. 3 is an elevation view of a reflecting plate used in the device shown in FIGS. 1 and 2;

FIGS. 4 through 9 are enlarge cross-sectional views of portions of the reflecting plate shown in FIG. 3, at various stages in its manufacture;

FIG. 10 is an elevation view of another reflecting member constructed in accordance with the present invention; and FIG. 11 is an end elevation view of another focusing device constructed in accordance with the present invention.

FIGS. 1 and 2 show an X-ray focusing and detecting device 20. The device 20 includes a housing 22 with an X-ray detector 24 at one end of the housing. The detector 24 has a relatively narrow horizontal array 25 of photo-multiplier elements or other well-known X-ray detector devices. It is desired to focus the incoming X-rays onto the relatively narrow band 25. Thus, the band 25 forms the focusing station in the device 20.

At the other or inlet end of the device 20 are positioned a number of reflecting plates 26. Bottom and top end members 28 and 30 and a centrally-located shield 32 complete the inlet end structure of the device 20. The end members 28 and 30 help provide support for the plates 26, and the shield plate 32, which is opaque to the X-rays, prevents the rays from directly reaching the photo-sensitive cells 25.

The reflecting plates 26 are arranged in two vertical series, one above and one below the longitudinal axis of the device 20. This arrangement is known in the prior art, and is merely exemplary of the many different configurations which reflecting surfaces of the present invention may take. Other configurations include, for example, frusto-conical surfaces arranged singly, or in series, or in nested groups of diminishing diameter. In fact, reflecting surfaces made in accordance with the present invention can be formed into virtually any shape desired.

Each of the plates 26 is spaced from the other plates so as to intercept a certain portion of the rays entering the two apertures at the inlet end of the device 20. Each plate 26 is inclined with respect to the longitudinal axis of the device 20, but the outermost plates are inclined at a greater angle than the innermost plates so that all rays will be focused at the focusing station 25.

The incoming X-rays, presumed to be emitted by a distant astronomical body, are shown schematically as parallel rays 34, 36, 38, and 40. It should be understood, of course, that the angles of incidence, etc., are exaggerated in the drawings for the sake of clarity. The angle at which the plate 26 is struck by beam 34 is such that the beam is deflected at a grazing incidence angle (e.g., 0.5 to 1.5 degrees) and is directed to the focusing station 25. The plate 26 upon which ray 38 is incident is mounted at a greater angle with respect to the longitudinal axis of the device 20 so that it will also focus its ray at the focusing point 25. It can be seen from FIG. 2 that a similar relationship holds true for the plates struck by the X-rays 36 and 40.

In an alternative embodiment of the invention, additional groups of plates 27 (see FIG. 2) can be placed between the first groups of plates 26. The plates 27, equal in number to the plates 26, are inclined to the longitudinal axis at a greater angle than the plates 26, and further deflect radiation from plates 26 to the focus 25. Thus, this is a multistage deflection focusing system.

Each of the plates 26 has a "tension-polished" reflecting surface. The manner in which such a surface is produced now will be described in connection with FIGS. 3 through 9.

FIG. 3 shows an ordinary glass plate 42 which preferably is to be used as the raw material for the tension-polished plate 26. Ordinary glass plate-forming techniques have been used to give the plate 42 a surface which appears to the naked eye to be quite smooth. FIG. 4 shows a segment 44 of the plate 42 which has been considerably enlarged to show the contour of the surface of plate 42 as it might appear under a low-power microscope. This surface can be seen to have bumps 46 and other imperfections such as that shown at 48. These imperfections disqualify the material 42 from being usable as a glancing-incidence reflection surface.

In accordance with one feature of the invention, the upper surface of the plate 42 preferably is treated by well-known "fire-polishing" techniques which are used to treat chemical beakers and glassware, and microscope slide covers.

First, the surface 42 is heated relatively rapidly until it becomes a relatively low-viscosity liquid. It should be understood, of course, that the remainder of the glass also is a "liquid," in the technical definition of the term, but has a very high viscosity. The plate is shown in FIG. 5 just after the heating step has been performed.

FIG. 6 shows a further enlarged portion 50 of the material shown in FIG. 5. The portion 50 includes the protrusion 48 on an enlarged scale, and the drawing indicates the surface tension forces which are applied by the liquid which tend to draw the material forming the protrusion downwardly into the body of the liquid. If the glass were to be cooled suddenly so as to return it to its initial high-viscosity state, the protrusion 48 would not have a chance to be leveled, and would be "frozen" into the surface. However, in accordance with the present invention, the glass is allowed to cool at a relatively slow rate, and the surface tension forces tend to even-out the irregularities. In fact, if the irregularities exist at all, surface tension forces cause them to move laterally along the liquid surface. The moving irregularities lose energy through the mechanism of viscous damping, with the eventual result that after the liquid has been maintained in a low-viscosity state for a substantial length of time, all surface irregularities are essentially smoothed-out. Of course, the process is carried on in surroundings which are as free of vibrations as possible. However, if vibrations should occur while the surface is in a low-viscosity state, any waves produced in the surface will be dissipated in the manner described above.

As is indicated in FIGS. 7 and 8, the glass is allowed to cool relatively slowly so that the irregularities all will be smoothed out by surface tension. Another way of describing this is by saying that the viscosity of liquid is allowed to increase over a time which is long compared to the time required for the viscous dissipation of the surface tension energy stored in the irregularities. When, as is shown in FIG. 9, the material has cooled completely to its original high viscosity state, it has an extremely smooth surface which has, in effect, been "polished" by the action of surface tension, and thus is a "tension-polished" surface.

Specific examples of procedures for making fire-polished glass plates whose surfaces are suitable for use as reflecting surfaces in the present invention are well known. For example, U.S. Pat. 3,233,995 describes a "float" process for making both "hard" and "soft" fire-polished sheet glass.

"Hard" glass having, for example, the following composition: $SiO_2$ 55%, $Al_2O_3$ 25%, CaO 5%, MgO 15%, and having a viscosity equal to $10^7$ poises at 1000° C., is melted in a tank and is floated on a non-oxidizable metallic silver bath contained in a tank. This bath is heated to a temperature between 965° C. and 970° C. Electric heating elements heat the atmosphere at the entrance of the tank in order to fire polish the upper surface of the formed glass sheet. The melted glass starts at a temperature of 1400° C. and cools quickly while it spreads over the bath and progresses towards the opposite end of the tank. This quick cooling is due to the high thermal conductivity of silver. At the exit end of the tank the glass sheet is at a temperature of about 1000° C. and it is raised from the silver bath by a roller with which it comes in contact at a temperature of about 950° C. At this temperature the viscosity of the hard glass is greater than $10^7$ poises and the fire polish of the sheet is not damaged by the roller.

"Soft" glass such as soda-lime glass having the following composition: $SiO_2$ 72.6%, $Na_2O$ 14.2%, $K_2O$ 0.1%, CaO 8.0%, MgO 3.9%, $Fe_2O_3$ 0.1, $Al_2O_3$ 1.1%, is melted and flows onto the silver bath whose temperature is maintained between 965° C. and 970° C. The glass is heated for fire-polishing as in the above example of "hard" glass polishing, and is cooled, both by the bath metal and by cooled air after the glass has been withdrawn from the bath, so that whereas it has a temperature of about 1250° C. when it enter the bath, the temperature of the glass sheet is about 970° C. where it leaves the bath and about 600° C. when air cooling is complete.

The process of fire-polishing plate glass after it has been formed into solidified plates also is well-known and is described, for example, in U.S. Pat. 797,335. Further discussion and description of fire-polishing techniques can be found, for example, in "Glass Manufacture," by Walter Rosenhain, pp. 124–128, Constable and Company, Ltd., London, 1919; "The Methods of Glass Blowing and of Working Silica in the Oxy-Gas Flame," by W. A. Shenstone, p. 31, Longmans, Green and Co., London, 1918; "Techniques of Glass Manipulation in Scientific Research," by J. D. Heldman, p. 27, Prentice-Hall, Inc., New York, 1946; and "The Manufacture of Glass," by L. M. Angus-Butterworth, pp. 131–132, Sir Issac Pitman & Sons, Ltd., London, 1948. However, it is not necessary to the practice of the present invention for one to know how to make fire-polished glass, since quite suitable glass plates such as the microscope slide covers described above are widely available and are relatively inexpensive to purchase.

Another method of tension-polishing the rough plate 42 is to anneal the plate; that is, to liquify the whole plate and not only its upper surface. This has the added advantage of relieving any stress which may appear in the body of the glass. However, the surface irregularities are removed in the same manner as described above.

It should be understood that it is not necessary to start with a solid plate of glass. Instead, the glass can be polished as the glass is being manufactured, by slowly cooling it from the molten state.

The foregoing is a description of tension-polishing as it is applied to glass. Glass is one of a number of materials whose viscosity changes greatly with temperature, and which remains a liquid (in the technical sense) at the desired final temperature.

Another way of performing tension-polishing is to form a reflecting surface from a polymer plastic material whose degree of polymerization increases with time so that its effective viscosity similarly increases with time. For example, a thin coating of epoxy resin mixed with its catalyst has been spread upon a smooth surface of a metal block and allowed to cure at room temperature for approximately twelve hours, thus curing at its normal curing rate. The surface formed in this manner was found to have a smoothness commensurate with that of the glass plate 26.

There are many well-known thermoplastic or thermosetting plastic materials such as acrylics whose viscosity increases to extremely high levels before the material crystalizes. Since the crystalization occurs only after the viscosity of the material has reached an extremely high level, the surface is smooth before crystallization occurs. Thus, these materials can be used to produce tension-polished surfaces.

Some liquid substances can be polymerized slowly by radiation. The slow increase in viscosity of these substances can be used in tension-polishing. An example of the latter materials is a mixture of triphenylphosphine and methyl methacrylate such as that disclosed on page 116 of "Physics Today," December 1966. That mixture is polymerized by ultraviolet radiation.

The viscosity of other liquids can be increased by drying. For example, various ordinary varnishes and lacquers have been painted upon smooth metal surfaces and dried at a relatively slow rate. The resulting surface was found to have a surface smoothness satisfactory for X-ray reflection. In one particular specimen, a varnish was applied to a smooth surface of a brass block and the varnish coating was allowed to dry slowly in an enclosure. This arrangement was found to provide a high concentration of solvent vapor in the atmosphere and slowed the drying rate of the varnish. The dried varnish coating proved to have a smoothness comparable to that of fire-polished glass.

Because of the extreme smoothness of a surface formed by tension polishing, metals can be evaporated onto the surface to form a similarly smooth coating useful in special applications. For example, gold can be evaporated onto a tension-polish glass surface. The addition of the gold improves the reflecting surface for many uses because the gold has a high atomic number and a high density.

As is shown in FIG. 10, a glass coating 56 can be applied to a smooth substrate 54 of metal or other material which does not have large pores. The glass can be tension-polished as described above to form an advantageous composite reflecting member whose surface takes the shape of the substrate. The surface of the substrate should be smooth, but ordinary machining techniques can be used to produce the requisite smoothness.

The member shown in FIG. 10 has a curved surface. One method of forming the glass layer 56 on the curved surface is to cover it with an even coating of glass frit, heat the frit to melt it and form a thin glass coating, and then slowly cool the surface as described above. The differential effects of gravity cause no substantial unevenness in the coating if care is exercised. If this becomes a serious problem in a particular geometry, the surface can be rotated to even-out the gravitational forces while cooling the glass. The glass layer is only around 1 mil thick and the liquid tends to remain evenly spread on the surface of a curved member despite differences in gravitational force on various parts of the layer.

Use of a metal substrate is beneficial for structural reasons if the glass layer is fire-polished after it has hardened. The metal retains the general geometric form desired for the finished surface.

Another way of forming a reflection coating on a support member, whether curved or flat, is to dip the member into a thixotropic material, tilt the member with respect to horizontal, and withdraw it from the material at a constant rate of speed. Any excess liquid which may gather in a bead at the lower edge of the structure can be removed easily merely by inserting a wick into the bead to drain off the excess.

A particularly simple and inexpensive way of forming a frusto-conical reflecting surface is to bend a flat strip of shim-stock metal (of brass, for example) into a frusto-conical shape, and then apply a tension-polished coating of one of the types described above, such as by applying and tension-polishing a glass coating. Expensive machining is not required, and the smoothness of the shim-stock surface is good enough to ensure a tension-polished surface of excellent smoothness. As is disclosed in the prior art, several such surfaces of different diameters and inclinations can be nested within one another concentrically to form a multiple-surface reflector system. Also, several such surfaces can be arranged in series to give a similar effect.

FIG. 11 is a front end view showing an alternative multiple-surface system constructed in accordance with the present invention. A plurality of groups 58 of parallel plates 26 like those shown in FIGS. 1 and 2 are arranged symmetrically about a central axis leading to a focal point 60. The groups 58 are arranged in concentric circular arrays with the inclination of the plates in groups near the axis being less than that of plates farther away so as to focus all of the radiation at the point 60. In this arrangement the radiation enters the focusing device in a direction into the plane of the drawing. Only a few of the plate groups 58 are shown in FIG. 11 in order to avoid unnecessary repetition. The arrangement shown in FIG. 11 provides a relatively large radiation collection surface area, and yet the cost of the device is relatively low because the plates 26 are inexpensive to produce.

The above description of the invention is intended to be illustrative and not limiting. Various changes or modifications in the embodiments described may occur to those skilled in the art and these can be made without departing from the spirit or scope of the invention as set forth in the claims.

What is claimed is:

1. A glancing-incidence radiation focusing device comprising, in combination, a housing a radiation receiving station in said housing, a focus station in said housing, a plurality of reflecting members, each having a tension-polished reflecting surface, said members being positioned in said housing between said receiving and focus stations for glancing incidence reflection of radiation towards said focus station.

2. Apparatus as in claim 1 in which the material of said members adjacent said surface is a relatively very high viscosity liquid.

3. Apparatus as in claim 1 in which said members are made of glass and said surface is fire-polished.

4. Apparatus as in claim 1 in which said surface is curved.

5. Apparatus as in claim 1 in which said surface is flat.

6. Apparatus as in claim 1 in which said members are made of annealed glass.

7. A glancing-incidence X-ray focusing device comprising, in combination, a housing, an X-ray receiving station in said housing, a focus station in said housing, X-ray detection means at said focus station, a series of reflecting plates, each having a tension-polished reflecting surface, said plates being positioned in said housing between said receiving and focus stations for glancing-incidence reflection of X-rays towards said focus station.

8. Apparatus as in claim 7 in which said plates are flat and are arranged into at least two transverse groups spaced symmetrically with respect to the longitudinal axis of said housing, the inclination of said plates with respect to said longitudinal axis increasing with the distance of the plate from said axis.

9. Apparatus as in claim 8 including two other groups of said plates spaced longitudinally toward said focus station and being inclined at a greater angle than corresponding plates of the first-named groups.

References Cited

UNITED STATES PATENTS

| 2,819,404 | 1/1958 | Herrnring et al. | 250—51.5 |
| 3,143,651 | 8/1964 | Giacconi et al. | 250—105 |

WILLIAM F. LINDQUIST, Primary Examiner

U.S. Cl. X.R.

65—65; 117—35; 250—105; 350—320